United States Patent Office.

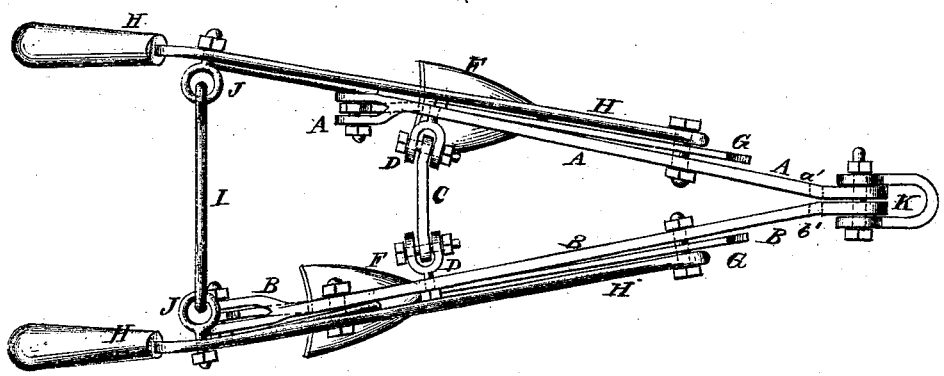
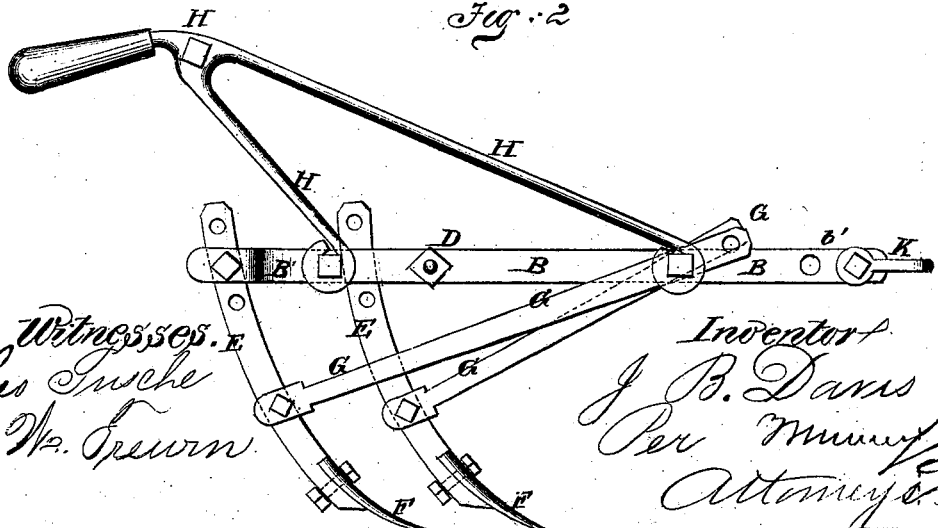

JONATHAN R. DAVIS, OF McKAY, OHIO.

Letters Patent No. 70,972, dated November 19, 1867.

---

IMPROVEMENT IN PLOUGHS.

---

The Schedule referred to in these Letters Patent and making part of the same.

---

TO ALL WHOM IT MAY CONCERN:

Be it known that I, JONATHAN R. DAVIS, of McKay, in the county of Ashland, and State of Ohio, have invented a new and useful Improvement in Ploughs; and I do hereby declare that the following is a full, clear, and exact description thereof, which will enable others skilled in the art to make and use the same, reference being had to the accompanying drawings, forming part of this specification, in which—

Figure 1 is a top or plan view of my improved plough.

Figure 2 is a side view of the same.

Similar letters of reference indicate corresponding parts.

My invention has for its object to furnish an improved plough, so constructed and arranged as to adapt itself to uneven ground, and so as to enable it to work close up to the upper row or plants upon side-hills, and which may be as readily adjusted for use as a rigid plough or as a single plough; and it consists in the construction, combination, and arrangement of the various parts, as hereinafter more fully described.

A and B are the plough-beams, the forward ends of which are connected and pivoted to each other by the clevis-bolt, as shown in figs. 1 and 2. The rear parts of the beams A and B are connected to each other and held in their proper relative positions by the bar C, the ends of which are pivoted to the forked or split heads of the bolts D, by which it is secured to said beams. By placing a nut upon each side of the beams A and B, the distance apart of said beams may be adjusted at pleasure. This construction enables each beam to rise and fall independently of the other, so that the plough can adapt itself to the unevenness of the ground. It also enables the handles of the plough to be inclined downward in working upon a side-hill, so that the upper plough may work close up to the plants without raising the upper plough out of the ground. One of the beams, as B, is made longer than the other, and the rear ends of both beams are split or made forked to receive the standards E, to the lower ends of which the ploughs F are attached in the ordinary manner. The standards E have several holes formed through them for the passage of the bolt by which they are secured to the beams A and B, so that the ploughs may be adjusted to run at a greater or less depth, as required. The standards E are supported and held in their proper working positions by the brace-bars G, the rear ends of which are forked or split, and are bolted to the standards E. The forward ends of the bars G have several holes formed through them for the passage of the bolts by which they are secured to the forward parts of the beams A and B, so that the ploughs may be adjusted to run at any desired angle. H are the handles, which are made in about the shape shown in fig. 2, and which are bolted to the beams A and B, as shown. The handles H are connected to each other by the bar I, the ends of which are connected to the said handles by eye or split bolts J, as shown in fig. 1, so that each handle may move with its own beam as the plough adapts itself to the unevenness of the ground. The plough-beams A and B may be rigidly connected to each other, when desired, by passing a bolt through the holes a' and b' formed in the forward parts of said beams a little in the rear of the clevis K for that purpose. By detaching the forward ends of the beams A and B from each other, and removing the connecting-bars C and I, the parts may be used as single ploughs; or, if desired, both handles may be attached to the same beam so as to have a two-handled single plough A. Another advantage of this construction is, that by inverting the beams A and B, or turning them upside down and changing their standards, the plough may be made a left-handed or a right-handed plough, as may be desired.

Having thus described my invention, what I claim as new, and desire to secure by Letters Patent, is—

1. Forming the beams A B, standards E, brace-bars G, and handles H, and adjustably connecting them to each other, substantially in the form and manner herein shown and described and for the purpose set forth.

2. The combination of the jointed or pivoted bars C and I, with the beams A and B, and handles H, substantially in the manner herein shown and described and for the purpose set forth.

JONATHAN R. DAVIS.

Witnesses:
BENJAMIN JONES,
A. D. ZIMMERMAN.